United States Patent
Maskatia et al.

(10) Patent No.: US 12,205,458 B2
(45) Date of Patent: Jan. 21, 2025

(54) SYSTEM AND METHOD FOR DELIVERING EMERGENCY ALERTS

(71) Applicant: Gray Media Group, Inc., Montgomery, AL (US)

(72) Inventors: Imran Arif Maskatia, Palo Alto, CA (US); Benjamin James Kauffman, Ridgefield, WA (US); Thomas Lee Rich, Meridian, ID (US); Nicholas James Hottinger, Boise, ID (US); Michael J. Chase, Jr., New Boston, NH (US)

( * ) Notice: Subject to any disclaimer, the term of this patent is extended or adjusted under 35 U.S.C. 154(b) by 0 days.

(21) Appl. No.: 18/369,189

(22) Filed: Sep. 17, 2023

(65) Prior Publication Data

US 2024/0265798 A1    Aug. 8, 2024

Related U.S. Application Data

(63) Continuation of application No. 17/508,221, filed on Oct. 22, 2021, now Pat. No. 11,763,666.

(51) Int. Cl.
| | |
|---|---|
| *G08C 15/00* | (2006.01) |
| *G08B 25/01* | (2006.01) |
| *G08B 25/10* | (2006.01) |
| *G08B 27/00* | (2006.01) |
| *H04W 4/021* | (2018.01) |

(52) U.S. Cl.
CPC .......... *G08B 25/016* (2013.01); *G08B 25/10* (2013.01); *G08B 27/008* (2013.01); *H04W 4/021* (2013.01)

(58) Field of Classification Search
CPC .... G08B 25/016; G08B 25/10; G08B 27/008; G08B 27/005; H04W 4/021; H04W 4/90
USPC ...................................................... 340/855.3
See application file for complete search history.

(56) References Cited

U.S. PATENT DOCUMENTS

| | | | |
|---|---|---|---|
| 7,308,697 B1 * | 12/2007 | Jerding | H04L 12/2801 348/E7.063 |
| 7,454,773 B2 * | 11/2008 | Pugel | G08B 25/08 725/35 |
| 7,716,662 B2 | 5/2010 | Seiden | |
| 8,745,655 B2 | 6/2014 | Reddy | |
| 9,154,854 B1 | 10/2015 | Straub | |
| 2002/0059495 A1 * | 5/2002 | Iida | G11B 27/329 711/103 |
| 2003/0200548 A1 | 10/2003 | Baran | |
| 2007/0083884 A1 * | 4/2007 | Kim | H04N 21/435 348/E5.005 |
| 2007/0136743 A1 | 6/2007 | Hasek | |
| 2008/0120639 A1 | 5/2008 | Walter | |
| 2008/0120645 A1 | 5/2008 | Yun | |
| 2009/0064220 A1 * | 3/2009 | Fan | H04M 11/04 725/33 |

(Continued)

*Primary Examiner* — Tai T Nguyen
(74) *Attorney, Agent, or Firm* — Krishna Kalidindi

(57) ABSTRACT

A method of communicating an emergency alert includes receiving, by a central content controller (CCC), audiovisual (AV) content from a plurality of sources, encoding the content, transmitting the encoded content to regional controllers (RCs) associated with respective market areas (MAs) for broadcasting over the air (OTA), determining existence of one or more alerts, for each existing alert, identifying recipients designated for receiving the alert and transmitting the alert to devices associated with the identified recipients over a network.

6 Claims, 4 Drawing Sheets

(56) References Cited

U.S. PATENT DOCUMENTS

| | | |
|---|---|---|
| 2010/0211970 A1* | 8/2010 | Howarter ............ H04H 20/106 |
| | | 725/33 |
| 2011/0095881 A1 | 4/2011 | Rosentel |
| 2011/0197223 A1 | 8/2011 | Ravula |
| 2012/0126976 A1 | 5/2012 | Bugenhagen |
| 2013/0247094 A1 | 9/2013 | Hardin |
| 2014/0075472 A1 | 3/2014 | Mitsuya |
| 2015/0256902 A1 | 9/2015 | Fusco |
| 2018/0041891 A1 | 2/2018 | Bleyl |
| 2019/0174204 A1 | 6/2019 | Deshpande |
| 2020/0074839 A1 | 3/2020 | Trigg |
| 2020/0119847 A1 | 4/2020 | Fay |

* cited by examiner

SYSTEM AND METHOD FOR DELIVERING EMERGENCY ALERTS

CROSS REFERENCE TO RELATED APPLICATIONS

This Application is a Continuation of U.S. application Ser. No. 17/508,221, filed on Oct. 22, 2022, which was issued as U.S. Patent Application No. 11,763,666 on Sep. 19, 2023.

BACKGROUND

This disclosure is directed to communication of emergency alerts. The use of Emergency Alert System (EAS) to communicate alerts is known. EAS replaced the Emergency Broadcast System (EBS) in 1997. EAS is designed to provide authorized officials the ability to communicate emergency alerts and warning messages to the public. These messages can be communicated via a broadcast antenna over the air (OTA) or by satellite to radio and television receivers.

A recently adopted television standard, ATSC 3.0 (Advanced Television Systems Committee) provides for the broadcast (over the air, OTA) of television signals an internet protocol (IP) format which is the format in which data is communicated over a broadband and/or internet connection.

OTA interface is a traditional communication path for broadcasting to all receivers within a physical viewing or receiving range. Transmission over a broadband (or network), on the other hand, can take place via unicast (one destination) or multicast (multiple destinations).

While EAS was designed to provide the President the ability to address the country in a national emergency via all radio and television stations, it has been used almost exclusively to communicate severe weather alerts such as tornadoes, flash floods, hurricanes, wildfires and AMBER alerts.

The EAS alerts can originate from local, state, or federal alerting authorities. The messages can be delivered as radio frequency (RF) signals such as AM/FM. The messages can also be delivered over the internet or via television (TV) broadcast stations. The alert can include a header, an audio signal, an audio message, a textual representation of the message an alert end signal (as well as various other metadata related to the alert).

In some systems, AV content may be encoded at a central location and communicated to local or regional areas for broadcast transmission. In these systems, a dedicated encoder is needed to encode EAS information at each broadcast transmission site for broadcast over the air (OTA).

Example embodiments of the present disclosure provides a more efficient, effective and reliable method for communicating alerts.

The terms "user", "viewer", "customer" and "consumer" are used interchangeably within this disclosure. A "viewer" and "viewer premises are also used interchangeably. The terms "AV signals", "AV content", "AV program", "data files" and "broadcast content" are also used interchangeably. The terms "communicated", "transmitted" and "submitted" are all used interchangeable to indicate the sending of data. The terms "existing" and "active" are also used interchangeably in referring to an alert.

SUMMARY

According to an example embodiment, a method of communicating an alert is disclosed. The method comprises: receiving, by a central content controller (CCC), audiovisual (AV) content from a plurality of sources; encoding the content; transmitting the encoded content to regional controllers (RCs) associated with respective market areas (MAs) for broadcasting over the air (OTA); determining existence of one or more alerts; for each existing alert, identifying recipients designated for receiving the alert; and transmitting the alert to devices associated with the identified recipients over a network.

According to another example embodiment, a system for communicating an emergency alert is disclosed. The system comprises: a central content controller (CCC) configured to: receive audiovisual (AV) content from a plurality of sources; encode the content; transmit the encoded content; determine the existence of an alert; for each active alert, identify recipients designated for receiving the alert; and transmit the alert, a plurality of regional controllers (RC) associated with a respective market area and configured to: receive the encoded content from the CCC; and broadcast, as AV signals, the received encoded content to an associated market area (MA), and a user device configured to: receive the alerts from the CCC.

According to a further example embodiment, a computer readable medium containing program instructions for communicating an emergency alert is disclosed. The execution of the program instructions by one or more processors of one or more computer systems causes the one or more processors to carry out the steps of: receiving, by a central content controller (CCC), audiovisual (AV) content from a plurality of sources; encoding the content; transmitting the encoded content to regional controllers (RCs) associated with respective market areas (MAs) for broadcasting over the air (OTA); determining existence of one or more alerts; for each existing alert, identifying recipients designated for receiving the alert; and transmitting the alert to devices associated with the identified recipients over a network.

BRIEF DESCRIPTION OF THE DRAWINGS

The several features, objects, and advantages of example embodiments will be understood by reading this description in conjunction with the drawings. The same reference numbers in different drawings identify the same or similar elements. In the drawings.

DETAILED DESCRIPTION

Figure 1:
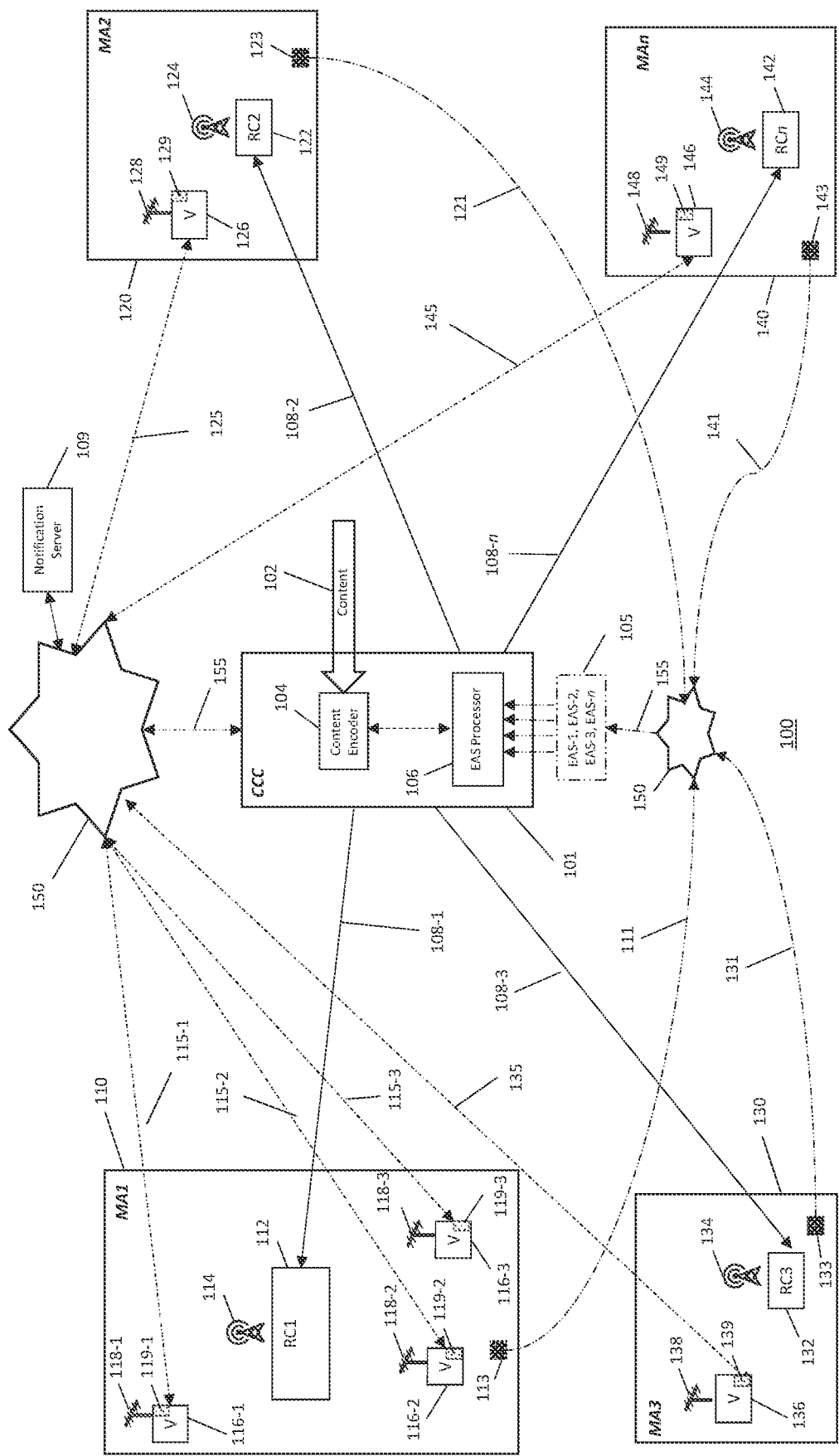
FIG. 1 illustrates a system according to example embodiments.

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the example embodiments.

Reference throughout this specification to an "example embodiment" or "example embodiments" means that a particular feature, structure, or characteristic as described is included in at least one embodiment. Thus, the appearances of these terms and similar phrases in various places throughout this specification are not necessarily all referring to the same embodiment. Furthermore, the particular features, structures, or characteristics may be combined in any suitable manner in one or more embodiments. The headings provided herein are for convenience only and do not interpret the scope or meaning of the embodiments.

According to example embodiments, methods and systems are disclosed for communicating EAS information without a dedicated encoder. Furthermore, alerts that are applicable to viewers in particular geographic, broadcast or market area may be communicated to those viewers from a location that is remote from (or, outside) the market area associated with the viewer. In addition, alerts that are not applicable to viewers in a particular geographic or broadcast area may also be communicated to those viewers.

A system in accordance with example embodiments may be described with reference to FIG. 1. System 100 may comprise a central content controller (CCC) 101. Viewers may be located in a plurality of market areas (MAs). A market area can be a broadcast coverage area or a geographic area. The physical size of a market area can vary from a few square miles to as much as over one hundred square miles. A MA can be a contiguous geographic area for example. In system 100 of FIG. 1, four such market areas 110, 120, 130 and 140 are illustrated. While four MAs are illustrated, this number is an example and the actual number of MAs can be higher or lower.

Each market area may have a regional controller (RC) associated therewith. RC1 (112) can be associated with MA1 (110), RC2 (122) can be associated with MA2 (120), RC3 (132) can be associated with MA3 (130) and RCn (142) can be associated with MAn (140).

Audio visual (AV) content 102 from a plurality of sources may be received at CCC 101. The source of the content may be a national network, etc. The content may be received by CCC 101 over dedicated terrestrial or satellite networks or over the Internet 150. The received content may be encoded by encoder 104 of CCC 101.

Content encoder 104 may encode the received content 102 into an IP delivery form using a particular codec such as MPEG-2 or H.265 for example. The encoded content can be packetized and encrypted. In can also be packaged using MPEG Dash or HLS or MP4 for example.

The encoded content may be communicated (as a data or video stream for example) by CCC 101 to one or more of a plurality of regional controllers (RCs) 112, 122, 132 and 142 (associated with market areas 110, 120, 130 and 140) over a corresponding communication medium or link 108-1, 108-2, 108-3 and 108-4. The communication medium can be a private network such as a VPN that can either be a terrestrial or a satellite link. The type of links (108-1, etc.) can differ between CCC 101 and the various destination RCs or over time.

A RC can have an antenna associated therewith for broadcasting the received encoded stream (content) as AV signals over the air (OTA) to viewers in the correspond market area (MA). That is, RC1 (112) can be associated with antenna 114, RC2 (122) can be associated with antenna 124, RC3 (132) can be associated with antennal 134 and RCn (142) can be associated with antenna 144.

The AV signals broadcast by the antenna can be received by viewers within reception range of the AV signals. In MA1 (110) for example, RC1 (112) broadcasts AV signals via broadcast antenna 114. Viewers 116-1, 116-2 and 116-3 within MA1 (110) can receive the AV signals broadcast by antenna 114.

A viewer 116-1 may receive the AV signals via an antenna 118-1 associated with the viewer premises for example. That is, antenna 118-1 can be associated with viewer 116-1, antenna 118-2 can be associated with viewer 116-2 and antenna 118-3 can be associated with viewer 116-3.

The received antenna signals can be decoded and processed for presentation to a viewer by a device such set-top-box (STB) 119-1 for example. A viewer and associated STB can be associated with a viewer premises such as a home or an office, etc. That is, STB 119-1 can be associated with viewer 116-1 and antenna 118-1, STB 119-2 can be associated with viewer 116-2 and antenna 118-2 and STB 119-3 can be associated with viewer 116-3 and antenna 118-3.

In MA2 (120), RC2 (122) can broadcast AV signals via broadcast antenna 124 for reception by viewer 126 via antenna 128 and processing by STB 129. A similar arrangement is illustrated for the remaining market areas such as MA3 and MAn.

For illustrative purposes, three viewers 116-1, 116-2 and 116-3 are shown as being located in MA1 (110) and within a reception range of broadcast antenna 114 of RC1 (112). One viewer (126, 136 and 146) is illustrated as being located in each of MA2 (120), MA3 (130) and MAn (140). However, the number of viewers within a MA is typically much higher. In some scenarios, a viewer can receive broadcast signals from multiple MAs due the viewer being located in a physical area where broadcast AV signals from adjacent MAs can overlap.

A viewer (116-1, 116-2, 116-3, 126, 136 and 146) within system 100 utilizing an associated STB can also be connected via a broadband connection (115-1, 115-2, 115-3, 125, 135 and 145) to CCC 101 over the Internet or the cloud 150. CCC 101 may be connected to the Internet 150 via a communication link 155.

The encoded content received by the RCs may be broadcast to viewers (or viewer premises) within the associated market area (MA) in the manner described above. A RC can receive signals from CCC that can include, for example, television programming for a plurality of channels.

In order to transmit EAS alerts in existing systems, the RC (that may receive an alert) is required to maintain an encoder for each channel of programming that is broadcast via the (RC's) associated antenna. Example embodiments obviate this need for dedicated encoders by processing and routing the alerts at a central location (such as at CCC 101).

Under ATSC 3.0, television signals may be broadcast in an internet protocol (IP) format. The IP format is a format that is also used for communicating data over a broadband and/or internet connection.

Referring to FIG. 1, in addition to receiving content 102, CCC 101 may also be configured to receive EAS alerts 105. Such alerts may be received from a plurality of MAs such as MA1-MAn.

Alerts generated by the various entities/authorities may be "gathered" by an EAS alert receiver and provide a single source of alerts to down stream systems. One such receiver is a DASDEC™ device from Digital Alert Systems, Inc. of Lyndonville, NY.

The alerts may be in the form of text files (such as in .xml format) and an audio stream. The receiver may normalize the alert data that can be received in different formats. The receiver can provide the alert data as textual metadata and an audio stream. The metadata can include federal information processing (FIPS) codes which provide a level of granularity to a county or sub-county level in which an alert may be applicable.

In example embodiments, such a receiver can be configured to communicate the alerts to the CCC via an internet connection. A receiver, such as receiver 113 of MA1 (110), can communicate any alerts for MA1 to CCC 101 via a communication link 111 over the Internet 150. Similarly, devices 123 of MA2, 133 of MA3 and 143 of MA2 can communicate any alerts for the respective MAs to CCC 101 via the respective communication links 121, 131 and 141 over the Internet 150. CCC 101 may be connected to the Internet 150 via a communication link 155.

In FIG. 1, Internet 150 and communication link 155 are shown in duplicate (above and below CCC 101) to reduce clutter in the illustration.

The EAS alert received from receiver may be processed by EAS processor 106 of CCC 101. The MA to which the received EAS alert is applicable may be determined. The CCC may in addition, or alternatively, identify all viewers that should be informed of the alert. The viewers receiving the alert need not be limited to those located within the market area to which the alert is applicable.

In order to be notified, a device associated with a viewer (such as STB 119-1 for example) may register for or subscribe to alerts for particular MAs. The device may communicate with a notification service such as notification server (NS) 109. Notification server 109 may be connected to all devices/STBs as well as to CCC 101 via the internet. The IP address or other similar means of contact for the device may be provided to NS 109. In some cases, the STBs can update their IP addresses with NS 109. This may be applicable if dynamic addresses are being assigned to the STBs for example. When an alert is issued, NS 109 may provide the identification to CCC 101 of the STBs that are to receive the alerts. In some embodiments, NS 109 may receive alerts from CCC 101 and (NS 109) may deliver them to the identified STBs based on the IP address for example. NS 109 may also be utilized by other sources of notifications (beside CCC 101) to provide notifications, other than emergency alerts, to the STBs. NS 109 may also be configured to receive acknowledgements of alerts or notification receipt by the STBs. Such acknowledgements may be used for auditing, redelivery or for redundancy purposes.

Content encoder 104 within CCC 101 may check with EAS processor 106 of CCC 101 to determine if an EAS alert is in effect. In example embodiments, the identity and related information of STBs may be known to NS 109 upon the STB being assigned to a user. An alert for a market area may be communicated to all STBs associated with a market area.

The functionality described above (content encoding/converting, EAS processing for example) can be performed by a processor associated with CCC 101.

Figure 2:
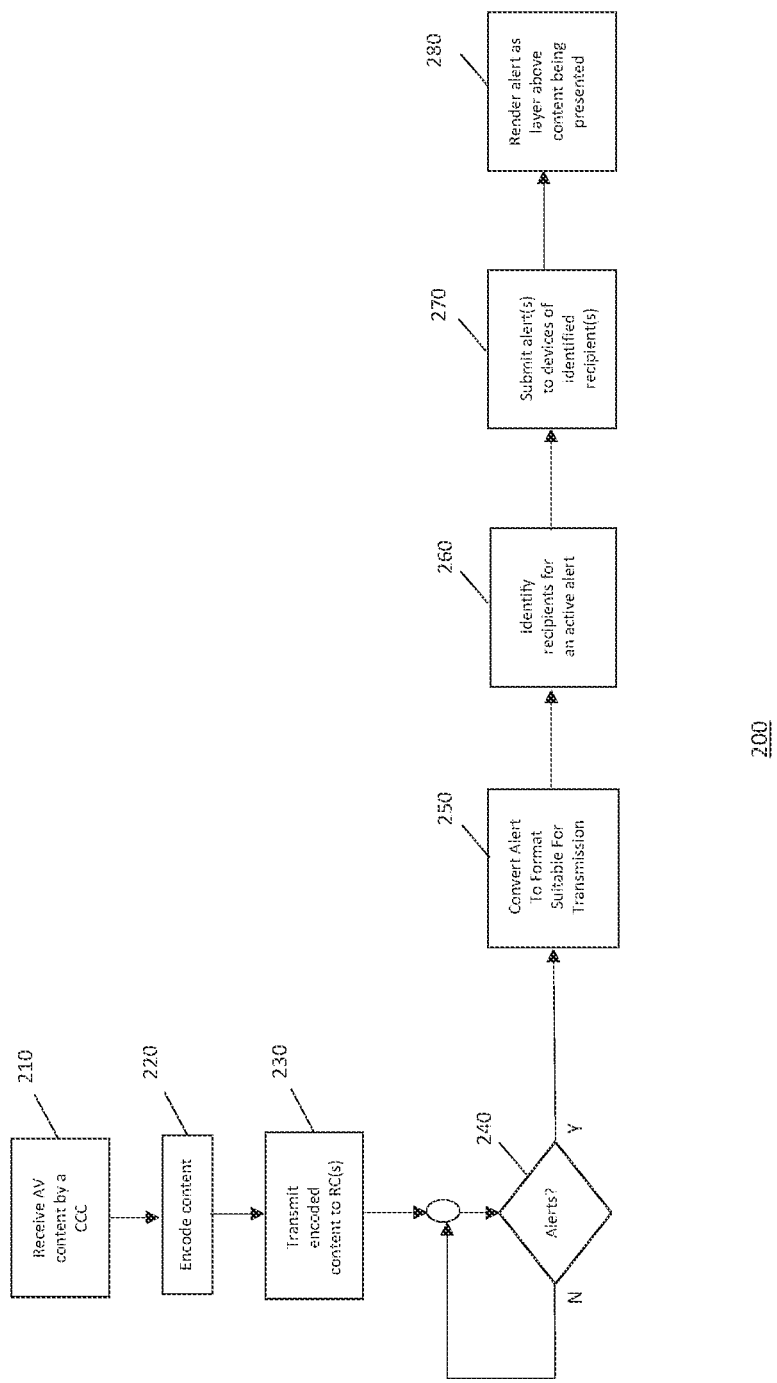
FIG. 2 illustrates a method according to example embodiments.

A method in accordance with example embodiments may be illustrated with reference to FIG. 2. In method 200, the CCC (such as CCC 101 of FIG. 1) may receive AV content from a plurality of sources at 210.

The received content may be encoded at 220. The encoded content may be transmitted (as a data/video/AV stream) by the CCC to regional controllers (RCs) at 230. The RC may broadcast the received stream over the air (OTA) to, at least the viewers located within the MA corresponding to the RC. In some situations, the broadcast may reach viewers in adjacent MAs.

A determination may be made at 240 as to whether any alerts have been received from one or more of receivers 113, 123, 133 and 143 (i.e. whether any active alerts exist). If no alerts are active, the CCC may continue to monitor for alerts at 210.

If, on the other hand, an active alert exists (i.e. at least one alert), the alert may be converted to a format suitable for transmission (as described in further detail below) at 250. A list of recipients that are designated for receiving the active alert may be identified at 260.

In order to identify the recipients, CCC 101 may communicate with NS 109 to identify the viewer devices (such as STBs 119-1, 129, etc.) that have subscribed to alerts for particular MAs as described above. In some embodiments, CCC 101 may submit the formatted alert(s) to NS 109 which in turn, may identify the recipients and communicate the alert(s).

The alerts received at the CCC 101 from receiver 113 in formats highlighted above may be converted into a format (extensible markup language or .xml-based for example) which may include, but is not limited to, text of the alert, timeframe during which the alert is applicable, location of the alert (physical area in which the alert is applicable is determined using the FIPS codes for example), a map of the area in which the alert is applicable and hints that are described further below. The format may also include a universal resource locator (URL) where an audio portion of the alert (a file or a livestream) may be located.

The (converted) alert may then be submitted to the identified recipient(s) or devices at 270. The alert may be communicated via a network such as Internet 150. The alert may be communicated by CCC 101 (or by NS 109) to a set-top-box (STB) associated with the identified recipient. If, for example, the recipient that is to be informed of an alert is at viewer premises 126, then the alert may be communicated by CCC 101 to STB 129 via the network 150 (utilizing link/connection 155 for example) since STB 129 is associated with viewer premises 126.

Example embodiments facilitate the communication of alerts to viewers outside the market areas for which an alert may be applicable. A viewer in MA3 may want to be informed of emergency situations in MA2 as the viewer in MA3 might have some business or personal interest in MA2 for example.

The alerts received by STBs may be rendered as a separate layer by the STB and presented over other AV content that is being presented to a viewer at 280. The user may set preferences on how the text portion of the alert may be "overlaid" above the displayed content. The preferences may include, but not limited to, text font, text size, text color, location on display where the alert is to displayed, etc. The audio portion of the alert may be a file or a live stream. The audio portion may be at a URL that can be accessed by the STB. The audio portion can be "played" by the STB when the text portion of the alert (i.e. simultaneously or synchronized with) is displayed on the screen. The audio may replace the audio that is currently being played on the display (such as from a current AV program being viewed, a video game being played, video on demand or the like). In some embodiments, the audio portion of the alert can be mixed in with audio that is currently being played.

Figure 3:
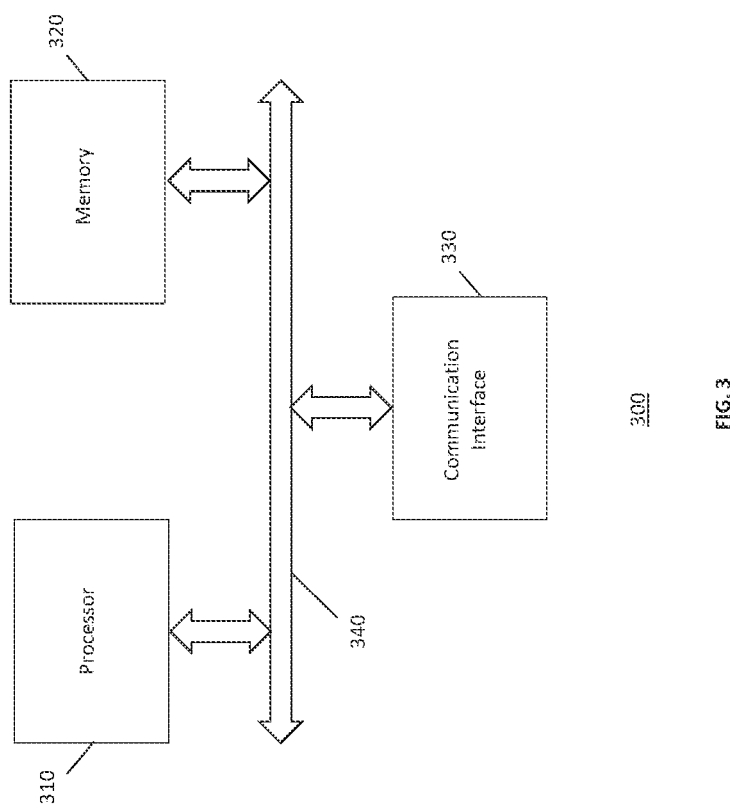
FIG. 3 illustrates a central content controller according to example embodiments.

A central content controller (CCC) in accordance with example embodiments is illustrated in FIG. 3. CCC 300 may include, but is not limited to, a processor 310, a memory 320, a communication interface 330 and a system bus 340 for interconnecting these components in a known manner. CCC 300 can be a general purpose computing device. A processor or memory can also refer to a plurality of processors or memory devices.

Processor 310 may incorporate the functionality of content encoder 104 and EAS processor 106 of FIG. 1 for example. It may encode content as described at step 220, check for existence of alerts as described at step 240, convert the alerts into a format for transmission as described at step 250 and identify recipients designated for receiving alerts as described at step 260 of FIG. 2.

Interface 330 may provide communication between CCC 300 (or CCC 101 of FIG. 1) and the plurality of RCs 112, 122, 132 and 142 in their respective MAs 110, 120, 130 and 140 via paths 108-1, 108-2, 108-3 and 108-4 for example. The paths may be dedicated private network(s) for example.

Interface 330 may also facilitate communication between the CCC 101 and STBs 119-1, 119-2, 119-3, 129, 139 and 149 (of FIG. 1) via the Internet 150. Interface 330 can also facilitate reception by CCC 101 of the alerts (EAS-1, EAS-2, EAS-3 and EAS-4 for example) from receiver(s) 113, 123, 133 and 143 via respective paths 111, 121, 131 and 141. Interface 330 may provide the communication (i.e. transmit, receive) as described above in steps 210, 230 and 270. Interface 330 further may facilitate communication between CCC 101 and NS 109.

CCC 300 may have AV content stored within memory 320. Memory 320 may also store any other information necessary for facilitating the functionality of CCC 101. This may include information received from the STBs, alerts received, list of viewers/subscribers and their corresponding market area and preferences for receiving alerts for particular market areas, routing information to communicate with RCs and instructions for encoding content for example.

A RC can also comprise a processor, a memory, a communication interface and a bus interconnecting these components as described with reference to a CCC. Utilizing these components, the RC can receive content from CCC and broadcast the content over the air (OTA).

Figure 4:
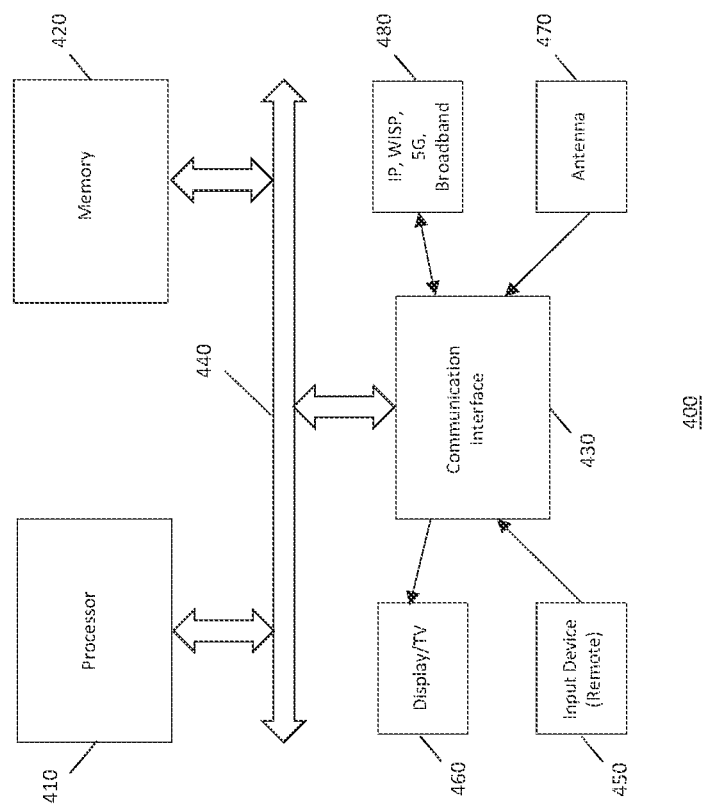
FIG. 4 illustrates a set-top-box (STB) according to example embodiments.

An example device associated with a viewer such as a set-top-box (STB) in accordance with example embodiments is illustrated in FIG. 4. STB 400 (labeled as 119-1, 119-2, 119-3, 129, 139 and 149 in FIG. 1) may include, but is not limited to, a processor 410, a memory 420, a communication interface 430 and a system bus 440 for interconnecting these components in a known manner.

Communication interface 430 may receive viewer inputs via a remote control or a keyboard or other such input device 450. Interface 430 may receive data signals via an antenna 470 (if signal is broadcast/broadcast multicast for example) or over an ISP gateway/modem 480.

Interface 430 may also provide communication with a display or monitor (e.g. TV) 460 for displaying AV content. The display may have audio output for playing the audio component of an AV file. Interface 430 may also communicate data with CCC 101 of FIG. 1. The data may include viewer input such as viewer preferences include content selection, etc. Memory 420 may store the received AV signals for viewing at a time chosen by the viewer.

Interface 430 may also provide communication with CCC 101 for receiving the converted alerts from CCC 101 as described above with respect to FIG. 1. The "hints" referred to above may provide additional instructions are specifics from CCC 101 to STB 400 (or, one or more of STBs 119-1, 119-2, 119-3, 129, 139 and 149 of FIG. 1 for example) for presenting the alert to a viewer. They may include, for example, color and font of the alert to be displayed.

Processor 410 may process the signals received via antenna 470 for presentation on display 460, various inputs from a user/viewer input device 450 and the alerts received from CCC 101.

Processor 410 may convert the alerts into a form suitable for presentation in an overlaid form over content being presented to the viewer. The content may be presented in a translucent or opaque manner. The alert may also be displayed to a viewer regardless of whether the viewer is viewing AV content that is being broadcast, AV content that was previously stored for later viewing, or is interacting with a gaming interface, etc.

If the display device is not powered on, the alert may also be utilized to initiate a signal from the STB to instruct the display device to switch on and a subsequent signal to switch inputs to the TV so that the input connecting the STB to the TV is activated. The signaling between the STB and the TV may be carried over a High Definition Multimedia Interface (HDMI) cable connecting the STB to the TV for example.

The STB could be any reception device. It need not be limited to a typical hardware device as highlighted above. It can be any device (or software) that comprises, but not be limited to, a processor, storage, internet connection and broadcast reception. It can be a mobile phone, a tablet, a laptop, a desktop or the like. It can be an application (or an "app") running on any of these devices. A component (or software module) may be a single device or be constituted as multiple devices (such as network-attached storage, etc.).

Viewers who wish to access alerts from market areas not associated with their (i.e. user's) location can subscribe to such service. Example embodiments as described may not be limited to presenting alerts over a display such as a TV. The STB of a viewer can access the viewer's location if the viewer is not present at his or her premises. The STB can communicate with the user's computing device (such as a computer or a mobile phone) that may be paired with the STB via a network protocol such as Bluetooth for example.

In some embodiments, CCC 101 may be able to access the viewer based on viewer location. Any device can subscribe to receiving alerts from NS 109. The subscribing device can provide NS 109 with its (device's) current location, its MA of interest and one or more communication methods via which the device can receive alerts from NS 109. The methods can include, for example, IP address, phone number for SMS or the like. A physical location of a STB can also be determined by viewer input of zip code via a remote control for example. The location can also be inferred from other data such as subscriber billing address, geolocation of the IP address associated with the STB or location information. The location information can be determined from a broadcast location as described in U.S. Pat. No. 11,089,363 assigned to applicant/assignee of the present application.

Example embodiments provide alerts that are not encoded into a video signal being broadcast. A viewer may wish to record the received broadcast content for later viewing. Such functionality is enabled by the STB (e.g. 119-1 of FIG. 1) as the signals are received from receiving antenna (e.g. 118-1 of FIG. 1). Alerts, on the other hand, are "overlaid" by STB prior to content being displayed by a TV (e.g. 460 of FIG. 4). As such, alerts received during recording of broadcast content may not be recorded. In this manner, if the recorded content is being viewed at a later time and the alert is inactive at this time, the alert may not be displayed.

Features and functionality associated with example methods and systems as described above may be implemented via software instructions executing on one or more processors of one or more general purpose computing devices or computing systems for example. By processing active alerts using processing resources at a central location, example embodiments obviate the need for having separate, dedicated encoders at the broadcast location (i.e. RCs 112, 122, 132 and 142 in system 100 of FIG. 1).

Since an alert is processed at the central location, processing resources at the central location may be reused in the sense that they can be used for alerts from different market areas at different times. For example, if an alert is active for MA1 but not for other MAs, there exists no need for dedicating resources for other MAs. Subsequently, if MA1 is not active and MA3 is active, the resources can be "switched" to processing the alert for MA3. If no alerts are active, the resources can be made available for other purposes. The processing resources may thus be used on a "just-in-time" or on an "as needed" basis. Such efficiency in terms of reuse for example reduces costs. In addition to providing alerts to viewers who are not located in a MA with an applicable alert, alerts are communicated to all viewers within the applicable MA.

Although example embodiments have been disclosed, it will be apparent to those skilled in the art that various changes and modifications can be made which will achieve some of the advantages of embodiments without departing from the spirit and scope of the disclosure. Such modifications are intended to be covered by the appended claims. Example embodiments are not limited to providing emergency alerts. Other types of alerts can be transmitted such as, but not limited to, public service announcements, school bus delays, a viewer-specific notification or the like. Other notifications such as a channel identification that may be required to be displayed every hour may be similarly transmitted for presentation or display.

Further, in the description and the appended claims the meaning of "comprising" is not to be understood as excluding other elements or steps. Further, "a" or "an" does not exclude a plurality, and a single unit may fulfill the functions of several means recited in the claims.

The above description of illustrated embodiments and what is described in the Abstract below, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in relevant art.

The various embodiments described above can be combined to provide further embodiments. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A set-top box (STB) comprising:
a processor;
a memory;
a communication interface connected to an antenna and to a modem; and
a system bus interconnecting the processor, the memory and the communication interface wherein
the antenna is configured to receive encoded content broadcast over the air (OTA) as audio video (AV) signals from a regional controller (RC) associated with a market area (MA) in which the STB is located, wherein the encoded content is received by the RC from a central content controller (CCC) over a communication link, the CCC encoding AV content received from a plurality of sources,
the processor is configured to
decode and process the received encoded content; and
present the processed content,
the modem is configured to receive emergency alerts in an Internet Protocol (IP) format from the CCC over a network, the network being distinct from the communication link wherein the CCC converts alerts received from an emergency alert system (EAS) into the IP format and identifies recipients designated for receiving an alert.

2. The STB of claim 1, being further configured to:
render the received alerts as a separate video layer over AV signals content being presented to a viewer associated with the user device.

3. The STB of claim 2, being further configured to:
render the alert independent of AV signals being presented to the viewer.

4. The STB of claim 1, being further configured to:
record AV signals being received over the air (OTA).

5. The STB of claim 4, being further configured to:
record the AV signals without recording alerts received during a reception of the AV signals.

6. The STB of claim 5, being further configured to:
render the alert active during a viewing of the recorded AV signals.

* * * * *